US012705979B2

(12) United States Patent
Selevan et al.

(10) Patent No.: US 12,705,979 B2
(45) Date of Patent: Aug. 11, 2026

(54) BACKUP POWER AND COMMUNICATION SYSTEMS FOR TRAFFIC SIGNALS

(71) Applicants: Adam Jordan Selevan, Laguna Beach, CA (US); James R. Selevan, Laguna Beach, CA (US); Daniel Joseph Selevan, Laguna Beach, CA (US)

(72) Inventors: Adam Jordan Selevan, Laguna Beach, CA (US); James R. Selevan, Laguna Beach, CA (US); Daniel Joseph Selevan, Laguna Beach, CA (US)

( * ) Notice: Subject to any disclaimer, the term of this patent is extended or adjusted under 35 U.S.C. 154(b) by 79 days.

(21) Appl. No.: 18/790,072

(22) Filed: Jul. 31, 2024

(65) Prior Publication Data

US 2025/0046183 A1 Feb. 6, 2025

Related U.S. Application Data

(60) Provisional application No. 63/530,027, filed on Jul. 31, 2023.

(51) Int. Cl.

*G08G 1/095* (2006.01)
*H02J 9/06* (2006.01)
*H04W 4/44* (2018.01)

(52) U.S. Cl.

CPC ................ *G08G 1/095* (2013.01); *H02J 9/06* (2013.01); *H04W 4/44* (2018.02)

(58) Field of Classification Search

None

See application file for complete search history.

(56) References Cited

U.S. PATENT DOCUMENTS 3,500,378 A 3/1970 Pickering et al.
3,787,867 A 1/1974 Dodge et al.
3,846,672 A 11/1974 Doughty
4,132,983 A 1/1979 Shapiro
4,249,159 A 2/1981 Stasko
4,345,305 A 8/1982 Kolm et al.
4,827,245 A 5/1989 Lipman
4,841,278 A 6/1989 Tezuka et al.
5,294,924 A 3/1994 Dydzyk
5,345,232 A 9/1994 Robertson
5,428,546 A 6/1995 Shah et al.
5,438,495 A 8/1995 Ahlen et al.
5,551,370 A 9/1996 Hwang
5,659,305 A 8/1997 Rains et al.

(Continued)

FOREIGN PATENT DOCUMENTS

CN 102147954 A 8/2011
CN 105812673 A 7/2016

(Continued)

OTHER PUBLICATIONS

Finley, M.D. et al., "Sequential Warning Light System for Work Zone Lane Closures," Texas Transportation System, (2011) pp. 1-23.

(Continued)

*Primary Examiner* — John F Mortell
(74) *Attorney, Agent, or Firm* — Robert D. Buyan; STOUT, UXA & BUYAN, LLP

(57) ABSTRACT

Devices, systems and methods for powering, controlling and monitoring traffic signals and providing alerts/notifications regarding power outages affecting traffic signals.

13 Claims, 9 Drawing Sheets

(56) References Cited

U.S. PATENT DOCUMENTS 5,673,039 A 9/1997 Pietzsch et al.
5,754,124 A 5/1998 Daggett et al.
6,299,379 B1 10/2001 Lewis
6,332,077 B1 12/2001 Wu et al.
6,486,797 B1 11/2002 Laidman
6,549,121 B2 4/2003 Povey et al.
6,614,358 B1 9/2003 Hutchison et al.
D498,164 S 11/2004 Delich
6,929,378 B2 8/2005 Wang
D510,289 S 10/2005 Dueker et al.
6,963,275 B2 11/2005 Smalls
D515,957 S 2/2006 Dueker et al.
D515,958 S 2/2006 Dueker et al.
7,088,222 B1 8/2006 Dueker et al.
7,106,179 B1 9/2006 Dueker et al.
7,182,479 B1 2/2007 Flood et al.
7,230,546 B1 6/2007 Nelson et al.
7,277,809 B1 10/2007 DeWitt, Jr. et al.
7,298,244 B1 11/2007 Cress et al.
7,301,469 B1 11/2007 Hoffman et al.
D560,533 S 1/2008 Dueker et al.
D564,387 S 3/2008 Rubin et al.
7,455,419 B2 11/2008 Helget et al.
7,563,158 B2 7/2009 Haschke et al.
D631,582 S 1/2011 Hwang
8,072,345 B2 12/2011 Gallo
D654,387 S 2/2012 Wilson et al.
8,154,424 B2 4/2012 Selevan
8,220,950 B1 7/2012 Sunshine
D669,805 S 10/2012 Edwards et al.
D678,100 S 3/2013 Hwang
8,550,653 B2 10/2013 Wilson et al.
8,564,456 B2 10/2013 Selevan
8,579,460 B2 11/2013 Wilson et al.
8,602,584 B2 12/2013 Ghafoori et al.
8,643,511 B1 2/2014 Batterson
8,672,517 B2 3/2014 Chung et al.
8,770,774 B2 7/2014 Ye et al.
8,786,461 B1 7/2014 Daudelin
8,949,022 B1 2/2015 Fahrner et al.
9,066,383 B2 6/2015 Gerszberg
9,288,088 B1 3/2016 McIlroy
9,437,109 B1 9/2016 Stafford et al.
9,489,809 B1 11/2016 Dever et al.
D778,752 S 2/2017 Selevan
D778,753 S 2/2017 Selevan
9,835,319 B2 12/2017 Selevan et al.
10,066,808 B2 9/2018 Fernando
10,443,828 B2 10/2019 Selevan et al.
2002/0006313 A1 1/2002 Pas
2002/0008637 A1 1/2002 Lemelson et al.
2002/0027510 A1* 3/2002 Jones .................... G08G 1/095 340/693.2
2002/0036908 A1 3/2002 Pederson
2002/0067290 A1 6/2002 Peet, II et al.
2002/0115423 A1 8/2002 Hatae et al.
2002/0154787 A1 10/2002 Rice et al.
2002/0159251 A1 10/2002 Hart
2002/0175831 A1 11/2002 Bergan et al.
2003/0164666 A1 9/2003 Crunk
2004/0056779 A1 3/2004 Rast
2004/0100396 A1 5/2004 Antico et al.
2004/0113817 A1 6/2004 Novak et al.
2004/0124993 A1 7/2004 George
2004/0183694 A1 9/2004 Bauer
2004/0263330 A1 12/2004 Alarcon
2004/0264440 A1 12/2004 Wan et al.
2005/0040970 A1 2/2005 Hutchins et al.
2005/0134478 A1 6/2005 Mese et al.
2005/0210722 A1 9/2005 Graef et al.
2005/0248299 A1 11/2005 Chemel et al.
2005/0254246 A1 11/2005 Huang
2006/0072306 A1 4/2006 Woodyard
2006/0097882 A1 5/2006 Brinkerhoff et al.
2006/0104054 A1 5/2006 Coman
2006/0165025 A1 7/2006 Singh et al.
2007/0038743 A1 2/2007 Hellhake et al.
2007/0099625 A1 5/2007 Rosenfeld
2007/0115139 A1 5/2007 Witte et al.
2007/0153520 A1 7/2007 Curran et al.
2007/0155139 A1 7/2007 Hecht et al.
2007/0194906 A1 8/2007 Sink
2007/0222638 A1 9/2007 Chen et al.
2007/0222640 A1 9/2007 Guelzow et al.
2007/0250212 A1 10/2007 Halloran et al.
2007/0273509 A1 11/2007 Gananathan
2007/0273552 A1 11/2007 Tischer
2008/0037431 A1 2/2008 Werb et al.
2008/0042866 A1 2/2008 Morse et al.
2008/0091304 A1 4/2008 Ozick et al.
2008/0122607 A1 5/2008 Bradley
2008/0122656 A1 5/2008 Carani et al.
2008/0150758 A1 6/2008 Vallejo Sr.
2008/0198038 A1 8/2008 Mngst et al.
2008/0242220 A1 10/2008 Wilson et al.
2008/0267259 A1 10/2008 Budampati et al.
2009/0009406 A1 1/2009 Chu et al.
2009/0034258 A1 2/2009 Tsai et al.
2009/0034419 A1 2/2009 Flammer, III et al.
2009/0063030 A1 3/2009 Howarter et al.
2009/0115336 A1 5/2009 Wang
2009/0174572 A1 7/2009 Smith
2009/0187300 A1 7/2009 Everitt
2010/0109898 A1 5/2010 Kensy et al.
2010/0259199 A1 10/2010 McDermott
2011/0010094 A1 1/2011 Simon
2011/0175719 A1 7/2011 Ford
2011/0249430 A1 10/2011 Stamatatos et al.
2011/0249688 A1 10/2011 Liu
2012/0051056 A1 3/2012 Derks et al.
2012/0139425 A1 6/2012 Kim
2012/0249341 A1 10/2012 Brown et al.
2012/0256765 A1 10/2012 Selevan
2012/0277934 A1 11/2012 Ohtomo et al.
2012/0287611 A1 11/2012 Wilson et al.
2013/0113634 A1 5/2013 Hutchinson et al.
2013/0114268 A1 5/2013 Shigematsu et al.
2013/0166193 A1 6/2013 Goldman et al.
2013/0214924 A1 8/2013 Ko
2013/0221852 A1 8/2013 Bowers et al.
2013/0260695 A1 10/2013 Wang
2013/0271294 A1 10/2013 Selevan
2013/0293396 A1 11/2013 Selevan
2014/0071681 A1 3/2014 Ghafoori et al.
2014/0126187 A1 5/2014 Bennett et al.
2014/0210373 A1 7/2014 Baret
2015/0009682 A1 1/2015 Clough
2015/0077234 A1 3/2015 Fullam
2015/0117010 A1 4/2015 Auen
2015/0330616 A1 11/2015 Preuschl et al.
2015/0338079 A1 11/2015 Preuschl et al.
2015/0366275 A1 12/2015 Cserfoi
2015/0369456 A1 12/2015 Creusen et al.
2016/0144778 A1 5/2016 Tucker
2016/0174099 A1 6/2016 Goldfain
2016/0186971 A1 6/2016 Selevan et al.
2016/0248506 A1 8/2016 Ryan et al.
2017/0097128 A1 4/2017 Stafford
2017/0151994 A1 6/2017 Braunberger
2017/0160392 A1 6/2017 Brisimitzakis et al.
2017/0206783 A1 7/2017 Miller
2017/0287217 A1 10/2017 Kim et al.
2017/0354019 A1 12/2017 Julian et al.
2017/0355300 A1 12/2017 Kurata
2018/0079463 A1 3/2018 Pearce
2018/0248400 A1* 8/2018 Emmorey ............. G08G 1/095
2019/0018132 A1 1/2019 Decker et al.
2019/0132709 A1 5/2019 Graefe et al.
2021/0049907 A1* 2/2021 Dhillon .................. H04W 4/44
2021/0237777 A1 8/2021 Selevan et al.
2022/0309917 A1* 9/2022 Anthonny Paulino ..................... G08G 1/097
2023/0327479 A1* 10/2023 Podolefsky .............. H02J 7/02

(56) References Cited

U.S. PATENT DOCUMENTS

FOREIGN PATENT DOCUMENTS

| | | | |
|---|---|---|---|
| DE | 102008011228 | A1 | 8/2009 |
| EP | 1531444 | A2 | 5/2005 |
| JP | 03-162279 | A | 7/1991 |
| JP | 06-024012 | U | 3/1994 |
| JP | 11260102 | A | 9/1999 |
| JP | 2000-078666 | A | 3/2000 |
| JP | 2005-019013 | A | 1/2005 |
| JP | 3108195 | U | 4/2005 |
| JP | 2005113636 | A | 4/2005 |
| JP | 2007501971 | A | 2/2007 |
| JP | 2010/157213 | A | 7/2010 |
| JP | 2010221874 | A | 10/2010 |
| JP | 2011-254651 | A | 12/2011 |
| JP | 2012-060464 | A | 3/2012 |
| JP | 2013-131809 | A | 7/2013 |
| JP | 2014-056670 | A | 3/2014 |
| JP | 2014-107230 | A | 6/2014 |
| JP | 2014130409 | A | 7/2014 |
| JP | 2015-041438 | A | 3/2015 |
| JP | 2015-115317 | A | 6/2015 |
| JP | 2015-216050 | A | 12/2015 |
| JP | 3208109 | U | 12/2016 |
| JP | 2017092652 | A | 5/2017 |
| TW | 201528878 | A | 7/2015 |
| WO | WO 98/21519 | A1 | 5/1998 |
| WO | WO 2003/026358 | A1 | 3/2003 |
| WO | WO2005/015520 | A1 | 2/2005 |
| WO | WO 2007/030852 | A1 | 3/2007 |
| WO | WO 2009/111184 | A2 | 9/2009 |
| WO | WO2012/002163 | A1 | 1/2012 |
| WO | WO2012/064951 | A2 | 5/2012 |
| WO | WO 2014/099953 | A1 | 6/2014 |
| WO | WO 2014/115541 | A1 | 7/2014 |
| WO | WO 2014/130842 | A1 | 8/2014 |
| WO | WO 2016/070193 | A1 | 5/2016 |
| WO | WO2016/077812 | A1 | 5/2016 |
| WO | WO2017054162 | A1 | 4/2017 |
| WO | WO2019175422 | A1 | 9/2019 |
| WO | WO2021/104031 | A1 | 6/2021 |

OTHER PUBLICATIONS

Sun, C. et al., "Cost-Benefit Analysis of Sequential Warning Lights in Nighttime Work Zone Tapers", University of Missouri, Report to the Smart Work Zone Deployment Initiative, Jun. 6, 2011.
Internet Website Screen Capture, www.empco-lite.com; Sep. 6, 2010.
PCT International Search Report dated Apr. 27, 2018 in PCT Application No. PCT/US2018/017683.
International Search Report and Written Opinion dated May 28, 2014 in PCT Application US2014/017756. International Filing Date Feb. 21, 2014.
PCT International Search Report dated Mar. 18, 2016 in PCT Application No. PCT/US2015/060770.
PCT International Search Report dated Oct. 26, 2018 in related PCT Application No. PCT/US2018/041126.
Extended European Search Report dated Jun. 20, 2018 in related European Application No. 15858697.4.
Office Action Dated Oct. 23, 2019 in related Japanese Patent Application No. 2017-544855.
Non-Final Office Action Dated Mar. 17, 2011 in U.S. Appl. No. 12/381,565.
Non-Final Office Action Dated Nov. 8, 2012 in U.S. Appl. No. 13/440,930.
Non-Final Office Action Dated Oct. 8, 2014 in U.S. Appl. No. 13/774,029.
Non-Final Office Action Dated Aug. 11, 2014 in U.S. Appl. No. 13/775,177.
Final Office Action Dated May 8, 2015 in U.S. Appl. No. 13/774,029.
Final Office Action Dated Mar. 30, 2015 in U.S. Appl. No. 13/775,177.
Non-Final Office Action Dated Sep. 18, 2015 in U.S. Appl. No. 13/775,177.
Non-Final Office Action Dated Mar. 25, 2015 in U.S. Appl. No. 14/186,582.
Non-Final Office Action Dated Jan. 7, 2020 in U.S. Appl. No. 16/522,282.
Non-Final Office Action Dated Jan. 17, 2020 in U.S. Appl. No. 16/573,762.
Non-Final Office Action Dated Jan. 22, 2019 in U.S. Appl. No. 16/029,379.
Final Office Action Dated Sep. 5, 2019 in U.S. Appl. No. 16/029,379.
Non-Final Office Action Dated Nov. 30, 2016 in U.S. Appl. No. 15/177,192.
Non-Final Office Action Dated Apr. 19, 2017 in U.S. Appl. No. 14/941,646.
Non-Final Office Action Dated May 11, 2018 in U.S. Appl. No. 15/831,065.
Final Office Action Dated Dec. 27, 2018 in U.S. Appl. No. 15/831,065.
Final Office Action Dated Apr. 30, 2020 in U.S. Appl. No. 16/522,282.
Extended European Search Report dated Dec. 2, 2020 in related European Application No. 18751574.7.
Car 2 Car Communications Consortium: "Car 2 Car Communication Consortium Manifesto; Overview of the C2C-CC System, Version 1.1", Internet Citation, Aug. 2007, pp. 1-94, Retrieved from the Internet: URL:http://www.car-to-car.org/fileadmin/downloads/C2C-CC_manifesto.v1.1.pdf.
Jiang, Daniel et al., "Design of 5.9 ghz dsrc-based vehicular safety communication", IEEE Wireless Communications, Coordinated Science Laboratory; Dept. Electrical and Computer Engineering, University of Illinois at Urbana-Champaign, US, vol. 13, No. 5, Oct. 2006, pp. 36-43.
Caveney, Derek,"Cooperative Vehicular Safety Applications", IEEE Control Systems Magazine, IEEE Service Center, Piscataway, NJ, US, vol. 30, No. 4, Aug. 2010, pp. 38-53.
Boukerche, A. et al., "Vehicular Ad Hoc Networks: A New Challenge for Localization-Based Systems", Computer Communications, Elsevier Science Publishers, vol. 31, No. 12, Jul. 2008, pp. 2838-2849.
Rola Naja, "Wireless Vehicular Networks for Car Collision Avoidance", in "Wireless Vehicular Networks for Car Collision Avoidance", May 2013, Springer Verlag, retrieved from the Internet: URL:https://www.springer.com/de/book/9871441995629.
Extended European Search Report dated Mar. 2, 2021 in related European Application No. 18828265.1.
Office Action Dated Mar. 3, 2021 in corresponding Chinese Patent Application No. 201880057575.3.
PCT International Search Report dated Jul. 22, 2021 in PCT Application No. PCT/US2021/012872.
Office Action Dated Oct. 21, 2021 in corresponding European Patent Application No. 18751574.7.
Office Action Dated Oct. 11, 2021 in corresponding Chinese Patent Application No. 201880057575.3.
Office Action Dated Jan. 11, 2022 in related Japanese Patent Application No. 2019-543284.
Liu, Zhitian et al., "Efficient Single-Layer White Light-Emitting Devices Based on Silole-Containing Polymers," Journal of Display Technology, Mar. 2013.
Office Action Dated Feb. 7, 2023 in related Japanese Patent Application No. 2022-068386.
Office Action Dated May 9, 2023 in related Japanese Patent Application No. 2020-521857.
PCT International Search Report dated Apr. 26, 2023 in related PCT Application No. PCT/US2022/054158.
PCT International Search Report dated Jul. 14, 2023 in related PCT Application No. PCT/US2023/012840.
Office Action Dated Oct. 17, 2023 in corresponding Japanese Patent Application No. 2023-005832.
Office Action Dated Sep. 5, 2023 in corresponding European Patent Application No. 18751574.7.
Extended European Search Report dated Dec. 19, 2023 in related European Application No. 21738082.3.

(56) References Cited

OTHER PUBLICATIONS

PCT International Search Report dated Dec. 4, 2024 in related PCT Application No. PCT/US2024/040287.

* cited by examiner

BACKUP POWER AND COMMUNICATION SYSTEMS FOR TRAFFIC SIGNALS

RELATED APPLICATION

This application claims priority to U.S. Provisional Patent Application No. 63/530,027 entitled Backup Power and Communication Systems for Traffic Signals, filed Jul. 31, 2023, the entire disclosure of which is expressly incorporated herein.

FIELD OF THE INVENTION

The present invention relates generally to traffic control and highway safety, and more particularly to devices, systems and methods for powering, controlling and monitoring traffic signals, as well as alerting personnel during power interruptions.

BACKGROUND

Vehicle traffic flowing through an intersection is sometimes controlled by traffic lamps, referred to in the industry as signal heads. Signal heads contain lamps, such as LED bulbs, recognized by their red, amber, and green color; or there might be a lit arrow designating direction flow. Lighting of a particular color at a specific time is typically controlled by a Road Side Unit (RSU) found on the pavement or sidewalk. This cabinet contains electronics to coordinate and control signals and consequently traffic flow. These road side units, in North America, are powered by 110-120 volts AC, referred to as “mains” power. In other countries mains power might be 220 volts AC. Mains AC power fails frequently. Typical causes of AC failure are vehicular impact to a power pole, earthquake, tornado, hurricane, other natural disaster such as fire, etc. Another frequent cause of AC failure is vandalism. Copper wire has value on the recycle market, and individuals will break into the cabinet or pull box, cut the AC line, and pull wire for resale. Vandalism will result in failure of a subset of signal heads, whereas failure of the AC mains power to a region or municipality will result in all signal heads in an intersection failing.

When traffic signals go dark owing to power failure, drivers entering the intersection are at substantial risk, and fatalities occur. The invention described herein addresses the safety issue.

Intersections most often have numerous signal heads. For example, it is not uncommon to find 14 to 22 signal heads at one intersection. Current battery backup systems to support an intersection must be placed adjacent to the roadside unit. This requires space on the sidewalk, which is often difficult to obtain. State-of-the-art battery backup systems can be expensive to install. In many instances, concrete must be installed, new conduits pulled, labor, and equipment are required. In view of the cost and difficulty of installation, many traffic signals do not currently have battery backup systems. Accordingly, a low cost and reliable approach to providing battery backup to signal heads is needed. Additionally, there is a need in the art for the development of new battery backup systems that include communication capabilities such as remote control capabilities, cloud connectivity, transmission of data to real time traffic and/or electronic mapping services and transmission of information to receivers in oncoming vehicles, including autonomous vehicles.

SUMMARY

Described herein are devices, systems and methods providing power backup and/or communication capabilities in a traffic signal device which comprises at least one light emitter that operates on electrical line power.

In accordance with one aspect, disclosed herein is a power backup and communication system for providing backup power to a traffic signal that has at least one light emitter. Such power backup and communication system may comprise; a) a power supply such as a battery for providing backup power to said at least one light emitter and b) circuitry configured to i) determine when an actionable power interruption event has occurred; ii) cause said at least one light emitter to operate in an emergency mode using backup power from the battery in response to a determination that an actionable power interruption event has occurred; and iii) send data to and/or receive data from one or more other locations.

In accordance with another aspect, the above-summarized system's circuitry may be further configured to determine when line power becomes restored and, in response to a determination that line power has been restored, cause said at least one light emitter to return to usual function using the restored line power.

In accordance with another aspect, there is provided a kit for modification of a traffic signal device said kit comprising at least a power source (e.g., battery) and circuitry (a circuit board) of the above-summarized system. In some embodiments, such kit may further include other wiring and connection apparatus usable for installation of the power backup and communication system in the traffic signal device, an example of which is described in detail elsewhere in this application.

In accordance with another aspect, the power backup and communication system is configured for installation in, or is actually installed in, a traffic signal device which comprises at least one light emitter that operates on electrical power. In some embodiments, such traffic signal device may have a plurality of light emitters which turn on and off at different times and the circuitry of the power backup and communication system may be configured to determine that an actionable power interruption event has occurred when none of the light emitters have turned on for a predetermined latency period, which may be adjustable. In some embodiments, such traffic signal device may have a green light emitter, an amber or yellow light emitter and a red light emitter, and the circuitry of the power backup and communication system may be configured determine that an actionable power interruption event has occurred when each of said red, amber or yellow and green light emitters have failed to turn on for said predetermined latency period. For example, in some embodiments, the referenced latency period may be: less than 1 second; 1 second; less than 2 seconds; less than 5 seconds; 5 seconds; less than 10 seconds; 10 seconds; less than 15 seconds; 15 seconds; any full integer or full+ fractional integer value between 0.1 second and 120 seconds; or any full integer or full+ fractional integer value between 0.1 seconds and 5 minutes. In some embodiments, the latency period may be changed or adjusted locally or through remote control as described herein In accordance with another aspect, in some embodiments of the power backup and communication system, the circuitry may be configured to cause said at least one light emitter to emit flashing light or a single color when operating in said emergency mode. In some such embodiments in which the circuitry causes a light emitter to emit flashing light when operating in the emergency mode, the circuitry may also be configured to control the rate and duty cycle of flashing light emitted by that light emitter. In some such embodiments of the power backup and communication system, the circuitry may comprise a receiver which receives data comprising remote control signals, and may be configured to change or adjust the rate and/or duty cycle of the flashing light in response to received remote control signals.

In accordance with another aspect, the power backup and communication system circuitry may comprise a WiFi access point configured to send and/or receive information over a WiFi network.

In accordance with another aspect, the power backup and communication system circuitry may comprise a cellular modem and configured to send and/or receive information over a cellular network.

In accordance with another aspect, the power backup and communication system circuitry may be configured to communicate with a traffic monitoring or electronic mapping service.

In accordance with another aspect, the power backup and communication system circuitry may be configured to charge, or may comprise device(s) for charging, a battery of the system. In some such embodiments, the system may include a solar panel or solar collector for solar charging of the battery.

In accordance with another aspect, there are provided devices and systems for enabling traffic signal heads to function as WiFi access points on roadways. Such WiFi equipped traffic signal heads may then receive data (e.g., data on road or traffic conditions) by WiFi upload from vehicles which pass within range of such WiFi equipped traffic signal heads. These WiFi equipped signal heads may also be equipped to then transfer such uploaded data, by wired or wireless transmission, to remote servers or locations.

Further aspects, elements, variations and details of the presently disclosed devices, systems and methods may be appreciated from the accompanying drawings and the details descriptions of certain embodiments or examples set forth below.

BRIEF DESCRIPTION OF THE DRAWINGS

The accompanying

FIG. 1 is a diagram of one embodiment of a traffic signal head having one embodiment of a backup power and communication system installed therein in accordance with this disclosure.

FIG. 2 is a diagram showing a plurality of the traffic signal heads of FIG. 1 positioned at a four-way road intersection, along with an optional gateway device.

FIG. 3 shows components of one embodiment of a backup power and communication system installed in a traffic signal head, in accordance with this disclosure.

FIG. 4 is an enlarged view showing one portion of FIG. 3.

FIG. 5 is an enlarged view showing another portion of FIG. 3.

FIG. 6 is a schematic diagram of the circuitry of one embodiment of a backup power and communication system, in accordance with the present disclosure.

FIG. 7 is a diagram showing an example of the series of component functions that occur in one embodiment of a backup power and communication system, in accordance with the present disclosure.

DETAILED DESCRIPTION

The following describes certain non-limiting embodiments of intelligent traffic signals, kits (e.g., component parts and related connectors and installation apparatus) for modification of existing traffic signals and related methods.

Figure 1:
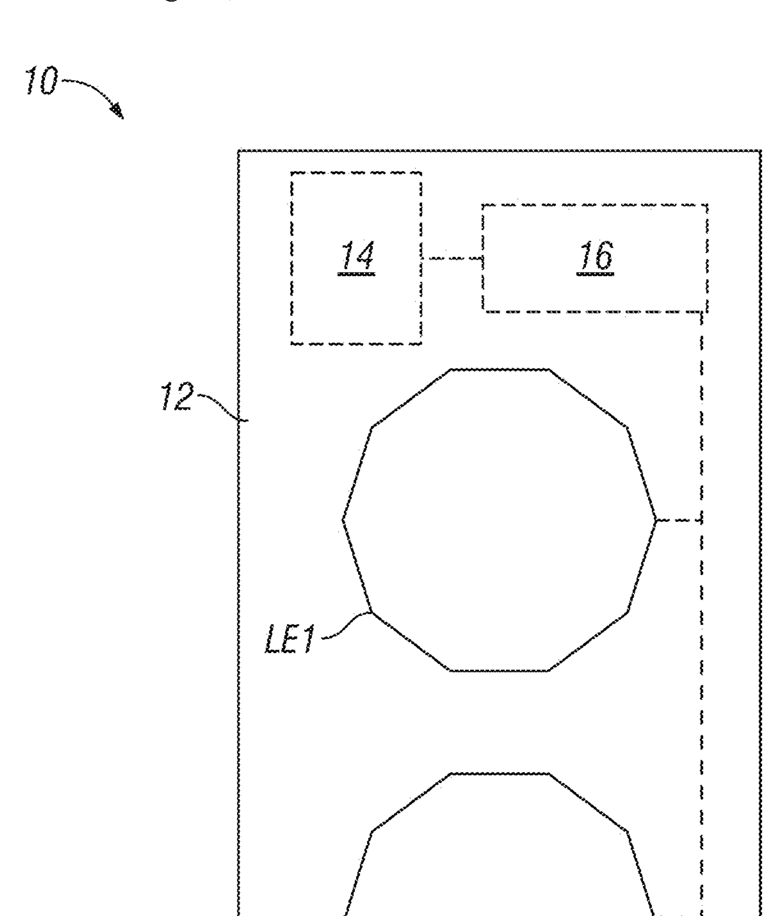
FIGS. 1 through 7 show certain non-limiting examples or embodiments of a novel illumination device and related systems and methods. These drawings are illustrative but not limiting. These drawings are not intended to show all possible examples and embodiments of the herein-disclosed devices, systems and methods.

FIG. 1 shows a traffic signal head 10 which comprises a housing 12 and three light emitters LE1, LE2 and LE3. In this example, the top light emitter LE1 may comprise a red lamp (e.g., a red light emitting diode (LED) or \other light emitter), the middle light emitter LE2 may comprise an amber (e.g., yellow) lamp (e.g., an amber or yellow light emitting diode (LED) or \other light emitter) and the bottom light emitter LE3 may comprise a green lamp (e.g., a green light emitting diode (LED) or other light emitter). In accordance with the present disclosure, a backup power and communication system comprising a backup power supply 14 (e.g., one or more batteries) and circuitry 16 (e.g., one or more integrated circuit boards) is mounted within the housing 12. As indicated by dotted lines, the backup power supply 14 is connected to the circuitry 16, and the circuitry is connected to the light emitters LE1, LE2 and LE3.

Figure 5:
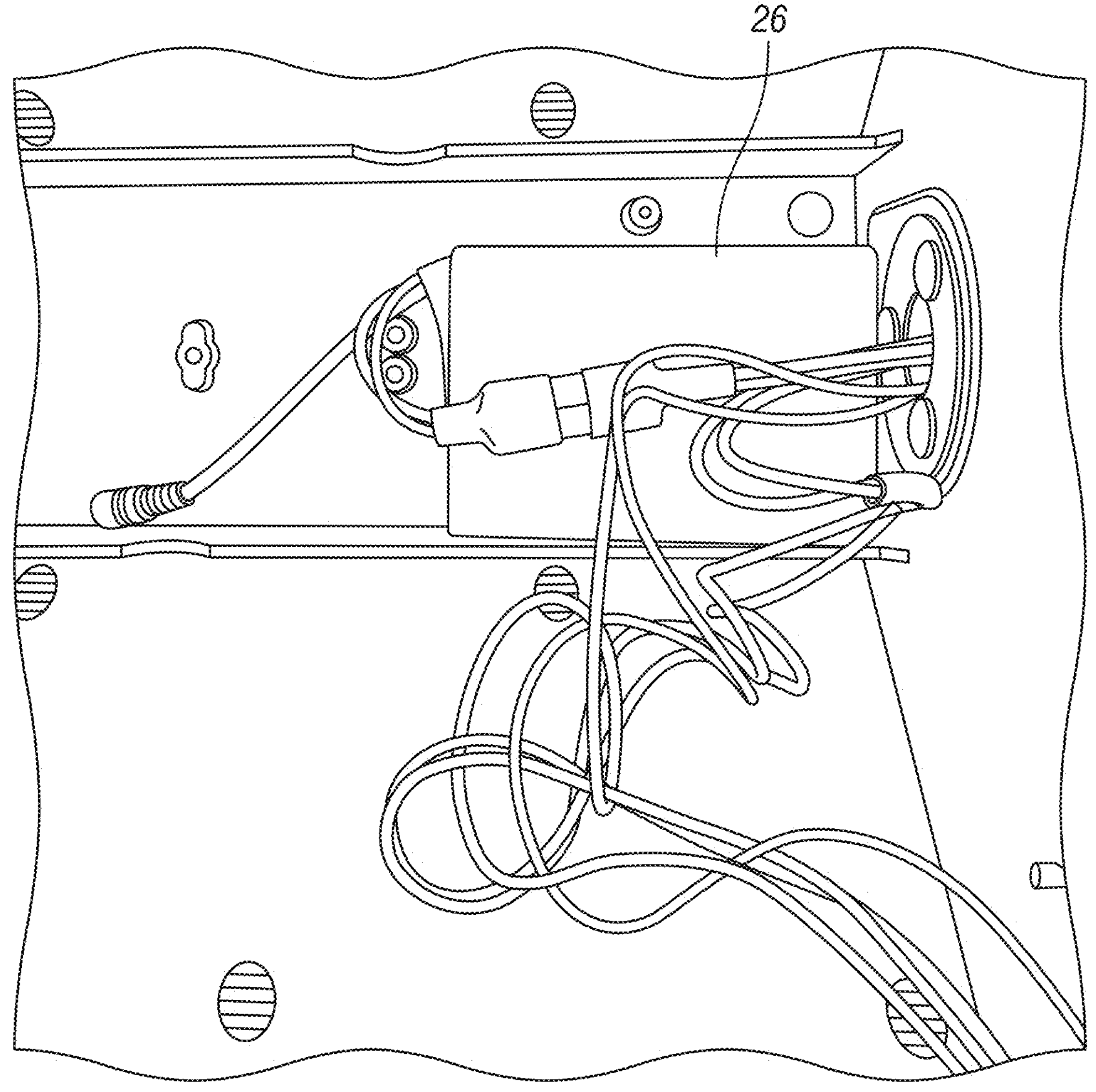

The circuitry 16 which may be in the form of one or more integrated circuit boards, is configured to a) determine when an actionable power interruption event has occurred; b) cause said at least one light emitter to operate in an emergency mode using backup power from the battery in response to a determination that an actionable power interruption event has occurred; and c) send data to and/or receive data from one or more other locations. The schematic circuit diagram of FIG. 5 shows components of one non limiting example of such circuitry 16.

The traffic signal head 10 of FIG. 1 routinely operates on electrical power, such as AC current, received via a power line ("line power"). Line power is delivered to each light emitter LE1, LE2 and LE3 at different times causing the light emitters to go on and off independently (e.g., a red light is emitted from the top light emitter LE1 for a period of time to signal oncoming traffic to stop, an amber or yellow light is emitted from the middle light emitter LE2 for a period of time to signal oncoming traffic to proceed with caution, and a green light emitted from the bottom light emitter for a period of time to signal oncoming traffic to proceed or "go." The circuitry 16 is configured to continually monitor the delivery of power to each of the three light emitters LE1, LE2 and LE3 and to determine that an actionable power interruption event has occurred when none of the three light emitters LE1, LE2 and LE3 has received line power for a predetermined latency period, which may be adjustable or selectable. The length of the predetermined latency period may vary depending on the type of traffic signal device, the number of light emitters included in the traffic signal device, traffic flow at the location, the typical frequency and typical duration of brief fluctuations or interruption in line power at that location, etc. However, in a typical application the predetermined latency period will be less than one (1) minute. For example, the predetermined time period may be 0.1 seconds, 1 second, 5 seconds, 10 seconds, 15 seconds, 20 seconds, or any other time period deemed to be suitable for the particular traffic signal device or location, such as, for example, any time period consisting of number of seconds designated by any full integer or full+ fractional integer value between 1 second and 120 seconds.

The circuitry 16 of the backup power and communication system may be configured to continue monitoring line power to light emitters LE1, LE2 and LE3 while the backup power and communication system is operating in emergency mode, and to return the light emitters LE1, LE2 and LE3 to normal operation on line power when it senses that like power has been restored.

Figure 2:
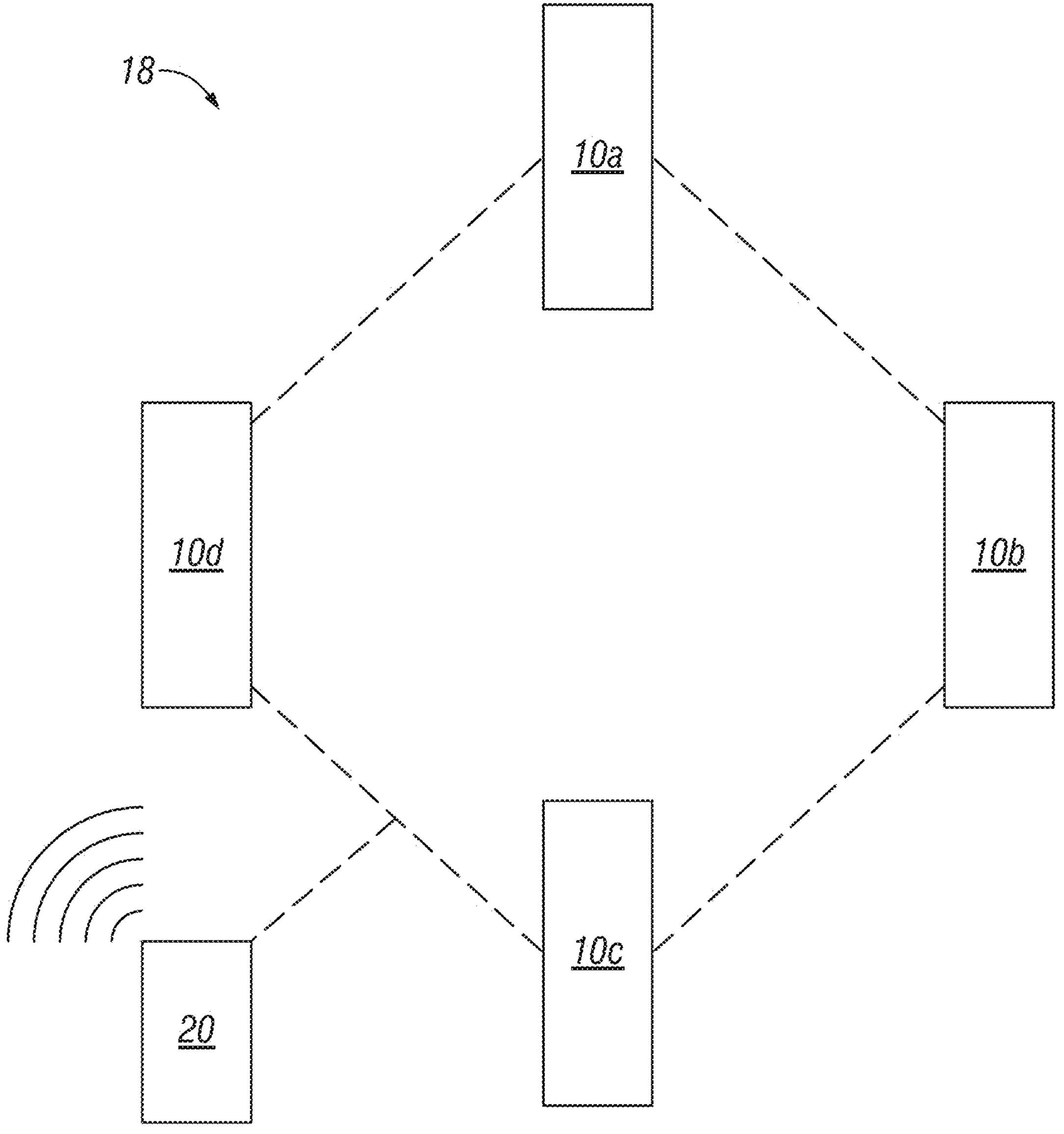

As noted above, the circuitry 16 includes component(s) to send data to and/or receive data from one or more other locations. Such components may comprise hardware for radiofrequency, cellular, satellite and/or internet communication. In some embodiments, the circuitry 16 in each individual signal device 10 may provide for intercommunication between a plurality of signal heads 10, and optionally to a separate gateway device that is equipped for further communication with remote location(s) and/or oncoming vehicles. One example of this is shown in FIG. 2, and further examples are described in copending U.S. patent application Ser. No. 18/108,465 entitled Networkable Devices for Internal Illumination of Traffic Cones and Other Traffic Channelizing Devices and Ser. No. 18/090,088 entitled Vehicular Incursion Alert Systems and Methods, the entire disclosure of each such application being expressly incorporated herein by reference.

With reference to the example of FIG. 2, there is shown a system in which four signal heads 10*a*, 10*b*, 10*c* and 10*d* are positioned at locations around a four-way road intersection. In this example, the circuitry 16 in each signal head 10 comprises radio frequency transmitters/receivers which enable intercommunication (e.g., mesh network communication) among the signal heads 10*a*, 10*b*, 10*c*, 10*d* such that, when an actionable power interruption event is detected in one signal head 10*a*, all of the signal heads around that intersection 10*a*, 10*b*, 10*c* and 10*d* will receive control signals causing them to operate in emergency backup mode (e.g., flashing red light). In the example of FIG. 2, an optional gateway device 20 also receives the radiofrequency communication from the signal heads 10*a*, 10*b*, 10*d*, 10*c* and is equipped to send and/or receive data to remote location(s) and/or oncoming vehicles, such as through cellular, internet (e.g., cloud), WiFi, satellite, and/or other mode circuitry 16 of the backup power and communication system s of communication.

Figure 3:
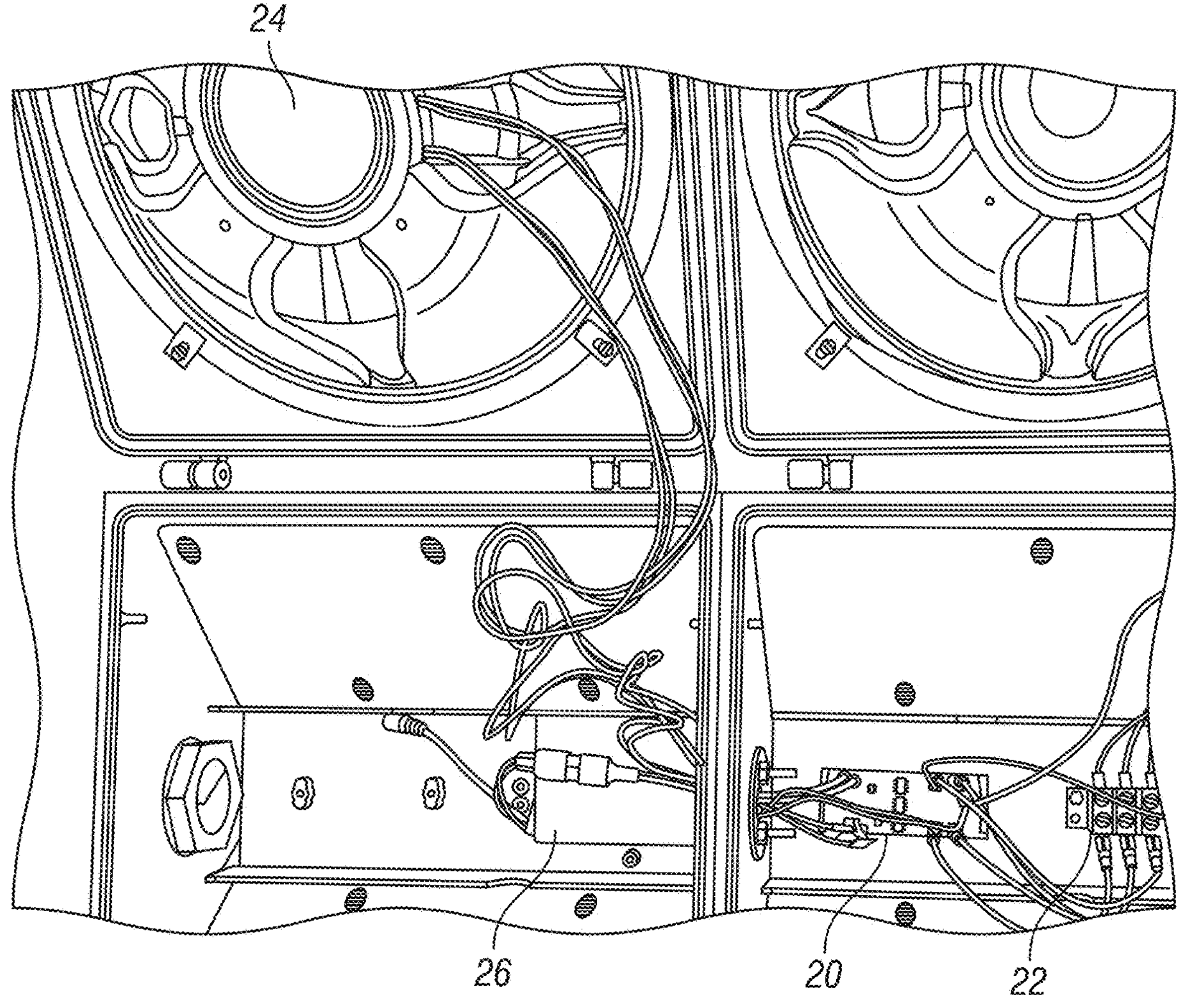
Figure 4:
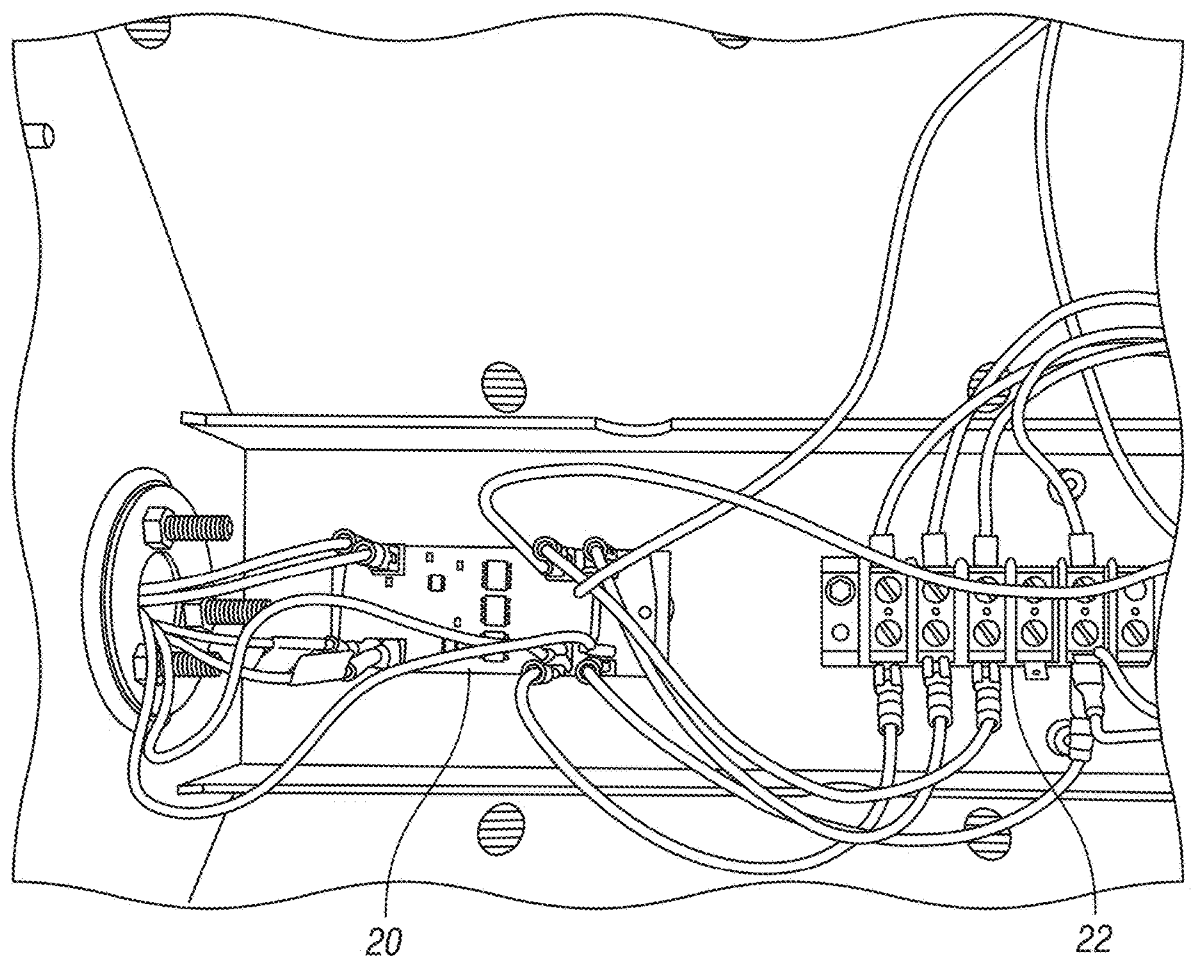

FIGS. 3 through 5 show one embodiment of the backup power and communication system installed within a traffic signal head housing which has red, amber and green signal lamps. In this embodiment, the circuitry 16 of the backup power supply comprises circuit board 20 (see schematic of FIG. 6) and the power source 14 comprises battery 26. A spade connector junction block 22 is also provided. 120 volt alternating current (AC) power from a remote sidewalk cabinet or other available source is connected to this junction block 26, as is the circuit board 20. The circuit board 20 and battery 26 are also connected to the red signal lamp 24, as show in FIG. 3. In this manner, the incoming AC power is re-routed to circuit board 20, the components and function of which are set forth in FIGS. 6 and 7 and described in further detail elsewhere in this application. In general, circuit board 20 senses when incoming AC power is lost on each of the three lines supplying the red, amber, and green lamps of the signal head. When there is simultaneous loss of AC power to all three (red, amber and green) lamps for a predetermined length of time (i.e., latency period) circuit board 20 then switches to provide power from battery 26 to the red signal lamp 24. The circuitry then causes the red signal lamp 24 to flash using backup power from the battery 26. Such flashing of the red signal lamp using power from the backup battery may continue for a period of time and in some embodiments as long as at least 25 hours, depending upon the size of the battery and availability of further charging of the battery during this time, such as by way of optional solar panels or solar collectors.

Example: Kits for Installation of Backup Power Supply and Communication System in Existing Traffic Signals In some embodiments, the backup power and communication system may comprise a kit (e.g., a collection of components) useable for modification of a pre-existing traffic signal head. For example, such kit may comprise at least the power supply 14 (e.g., battery 26) and circuitry 16 (e.g., circuit board 20). Optionally, in some embodiments the kit may comprise the junction block 22. Optionally, in some embodiments, the kit may comprise wiring (e.g., pre-cut wire of proper length, with proper terminals crimped on the ends). The wire could be color coded to connect the green lamp (green wire), red lamp (red wire) and amber lamp (amber wire) to the circuit board. The main AC power could be white (neutral) and black (electrically "hot"). Optionally, in some embodiments, the kit may comprise apparatus for attaching one or more components of the system to the signal head, such as, for example, screws (e.g., 1-inch self-tapping Phillips head screws), clips, hook and loop material (Velcro), and/or double-sided tape (with liner to be removed) for adhering the battery 26 to the signal head housing. Optionally, in some embodiments, the kit may comprise charging apparatus (e.g., charging cable, solar panel or solar collector) for charging the battery 26. An example of a basic embodiment of the kit may comprise the following:

- one or more battery(ies) 26: (optionally, may be a single battery for a basic operational time period (e.g., 15 hours) or two (2) batteries (or one larger battery) for a longer operational time period (e.g., 15 hours).
- control circuit board 20: Designed to be mounted directly into the signal enclosure using two self-tapping screws or to be mounted in a separate plastic enclosure that is mounted in the signal head (customer choice). The non-enclosed circuit board is conformal coated to protect against water contact and humidity.
- junction block 22: Standard spade connector block with mounting screw holes compatible with spacing for standard mounting holes. In some installations, it may not be necessary to replace an existing spade connecter block in the traffic signal if sufficient free terminals are available on the existing spade connector block.

Installing the Kit:

The following is an example of steps by which the above-described kit may be installed in an existing traffic signal head:

1) screw the circuit board 20 into the signal head enclosure (e.g., housing) at a convenient position. Typically, there are screw-hole bosses spaced equal to the mounting holes found on the circuit board.
2) if an existing junction block in the signal head lacks sufficient number of free spade connectors, remove the existing junction block and install the provided junction block 22.

3) attach the white wire to the circuit board 20 (labeled neutral) and then to the junction block.

4) attach each of the red, amber, and green wires to the circuit board and then to the junction block.

5) attach each of the traffic signal lamps to the corresponding spade connector on the junction block. There are 5 neutral spade connectors available on the provided junction block 22.

6) mount the battery 26 at a suitable location and attach the red and black battery wires to the circuit board 20.

7) establish connection to supply emergency power supply from battery 26 to red signal lamp 24 for controlled flashing of red signal lamp during outage of incoming AC line power.

8) attach the incoming line power source to the corresponding red, amber, green AC-IN spade connector.

Functionally the Kit:

The above-described kit facilitates installation of the backup power and communication system in an existing traffic signal so that the system performs the following functions:

monitors the three AC power lines, inserts the circuit board and battery between the incoming AC line and the red lamp.

upon failure of the three AC power sources, the system waits a predetermined period (for example, 1 second) and then uses the battery backup to flash the red signal once-per-second with a pre-specified duty cycle (on-to-off percentage).

Figure 6:
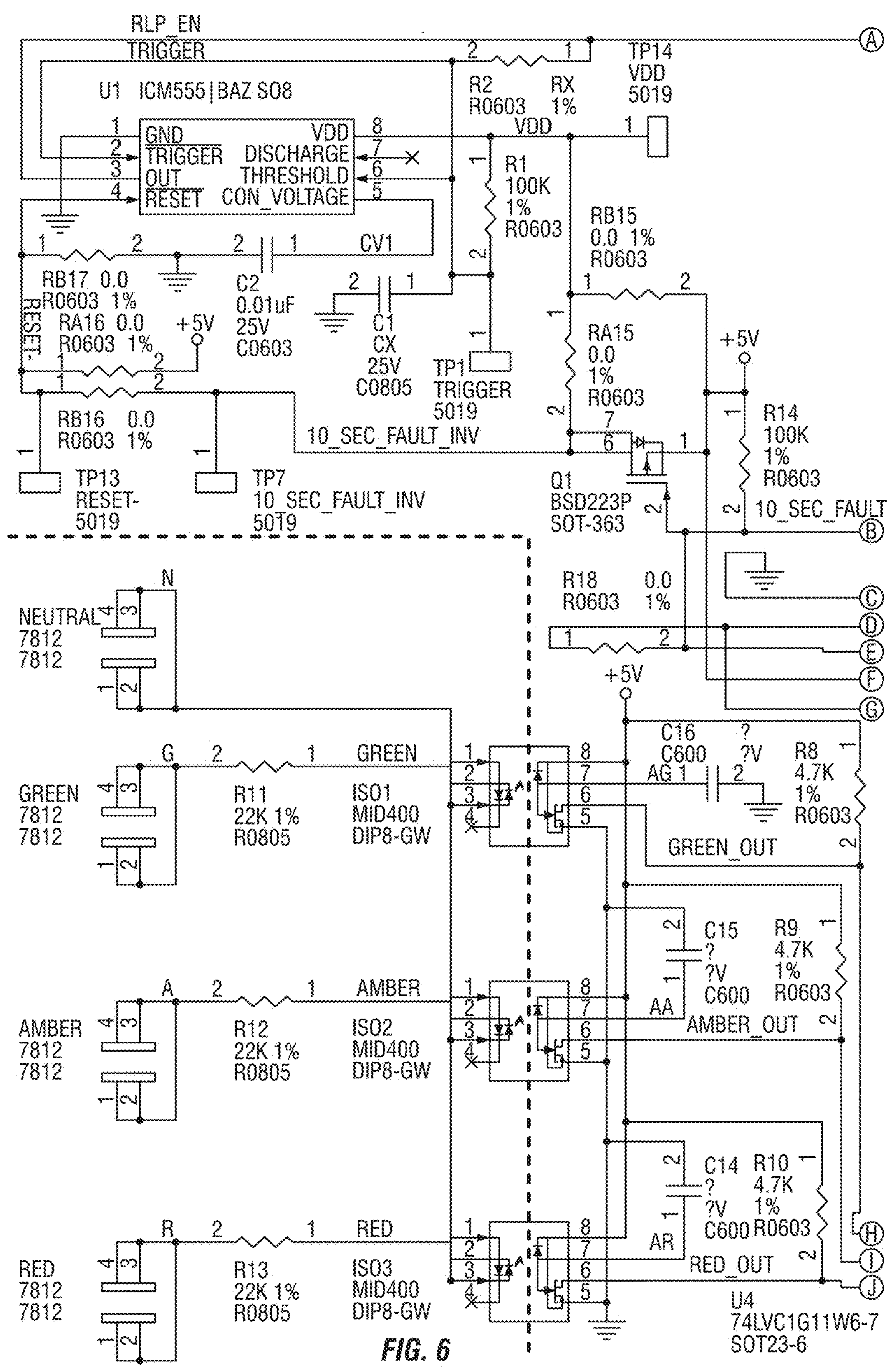
Figure 6:
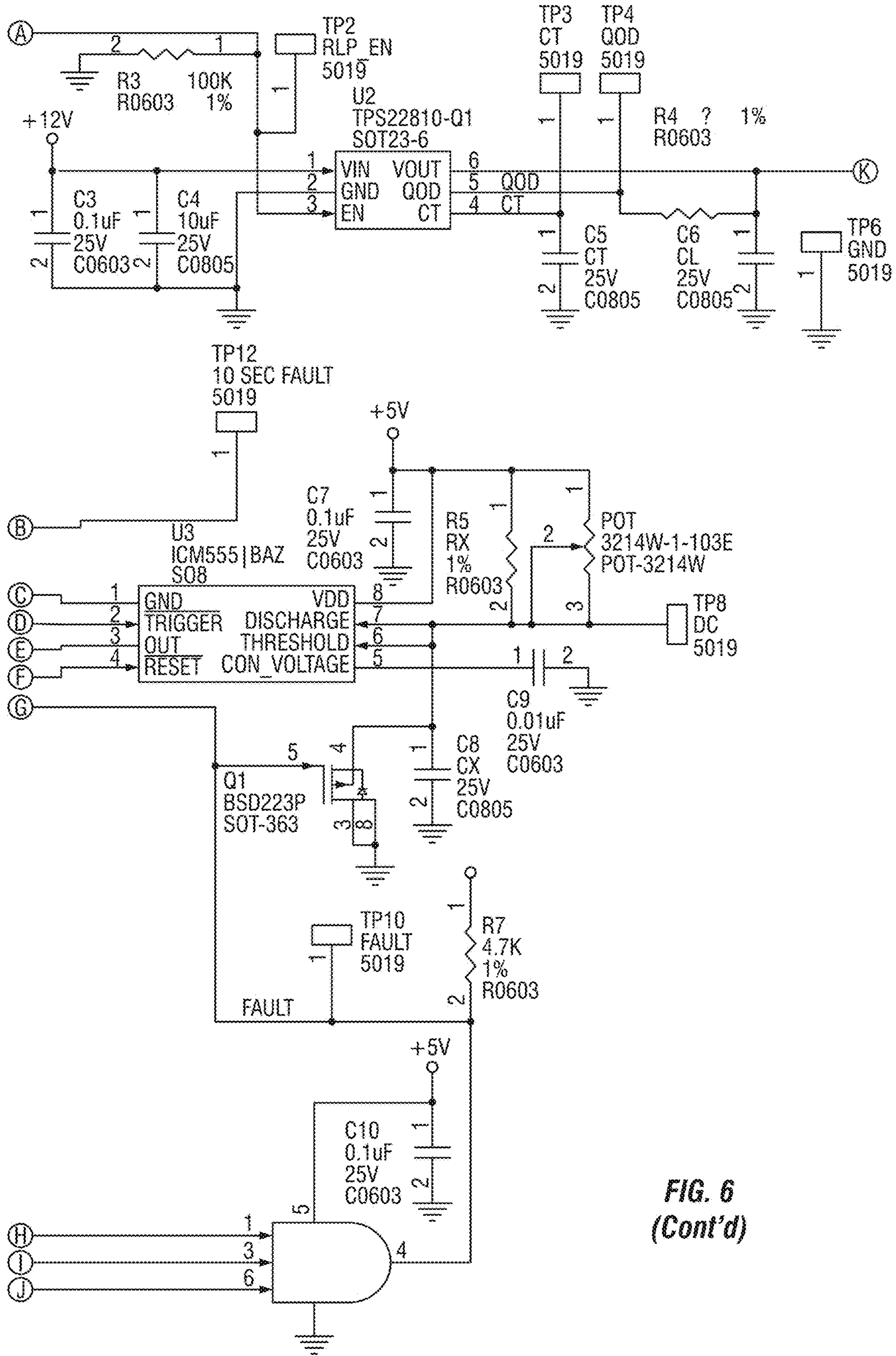
Figure 6:
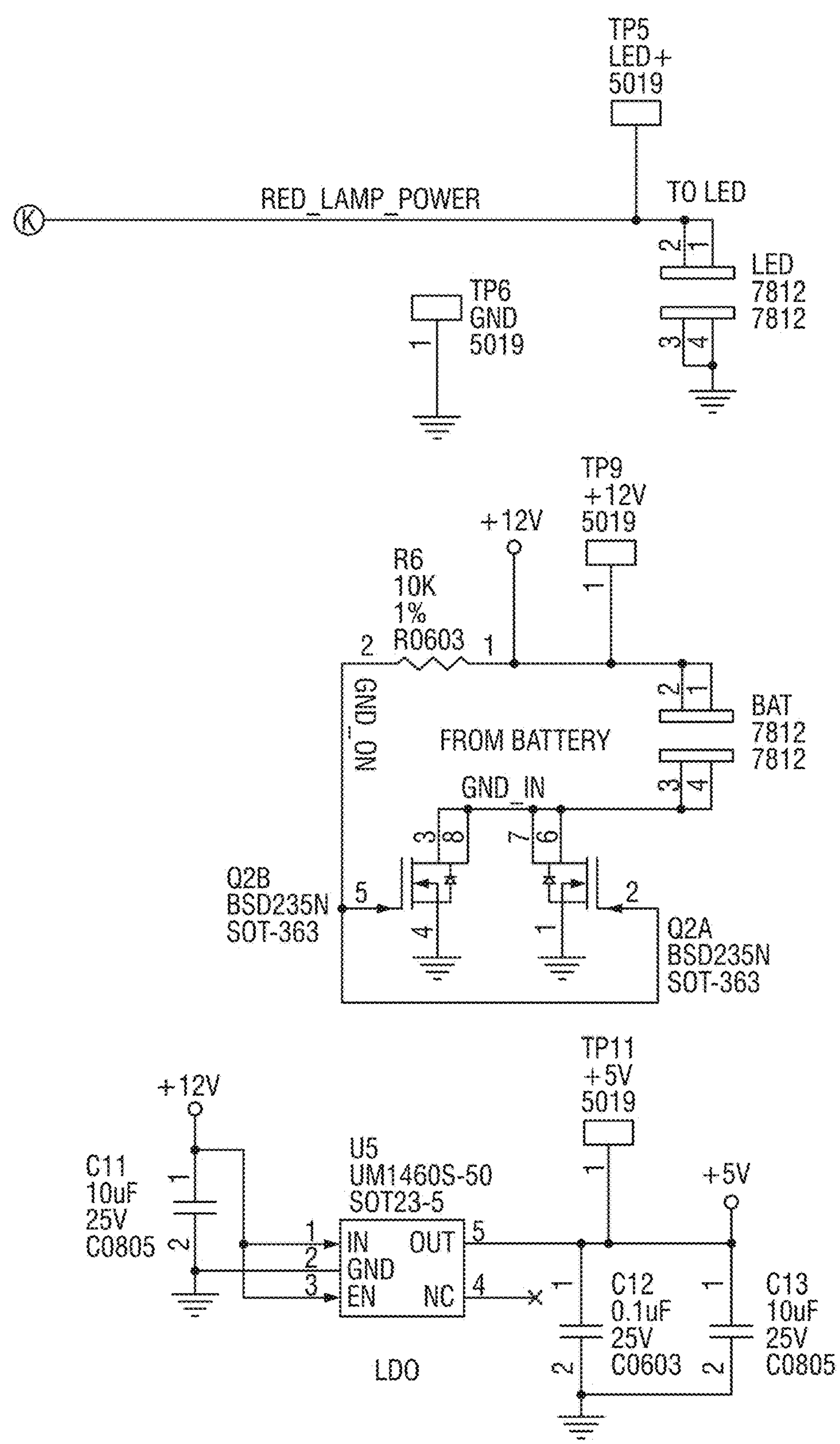

Examples of System Components:

FIG. 6 shows a detailed electrical schematic of one non-limiting embodiment of the backup power and communication system which comprises the backup power supply 14 (e.g., one or more batteries 26) and circuitry 16 (e.g., circuit board 20).

Figure 7:
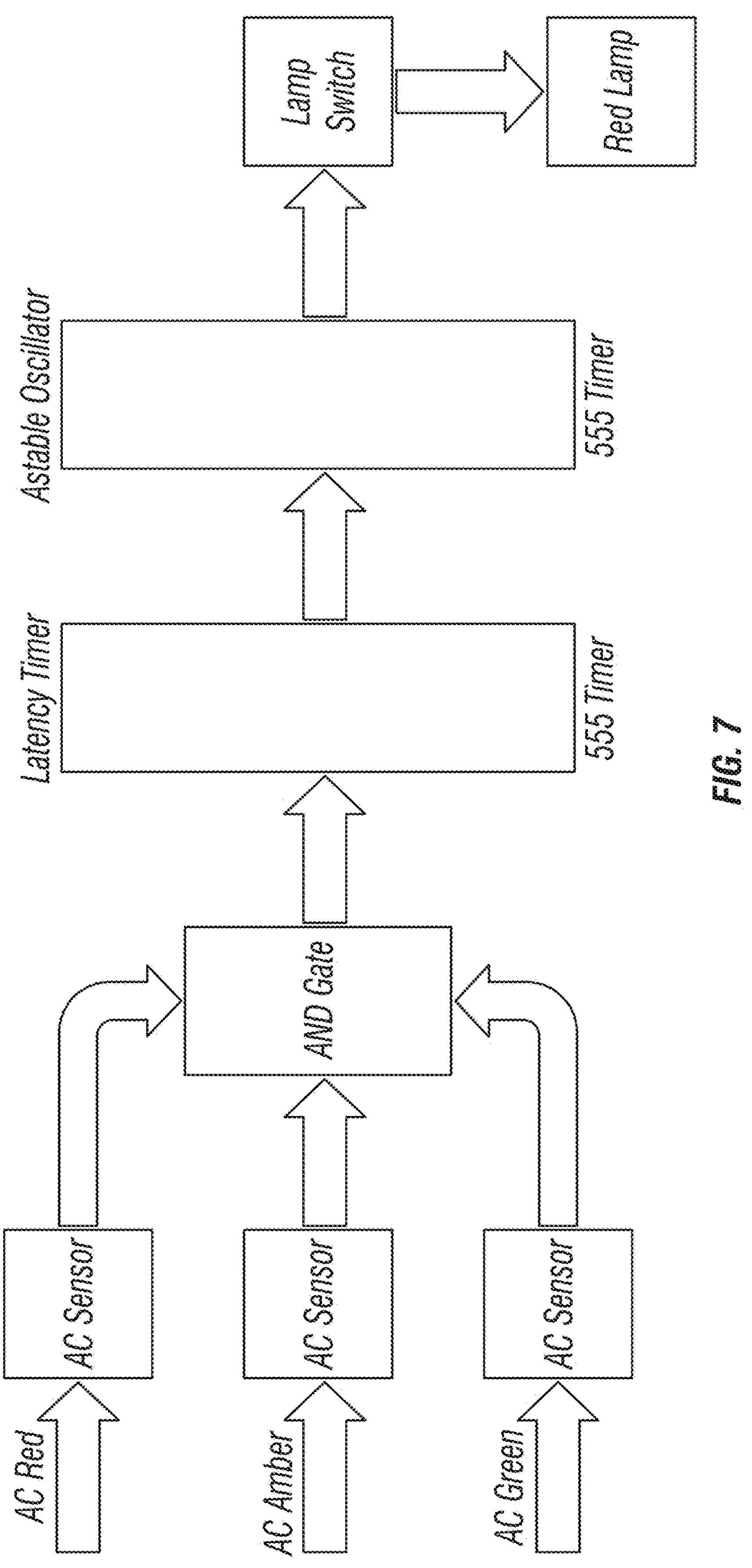

FIG. 7 is a block diagram representing the components and function of one embodiment of a backup power and communication system as disclosed herein. In this example, a traffic signal head comprises three light emitters or lamps, one green, one amber, and one red, each of which receives power via three independent 110-volt AC sources. A "mains" power failure, that is, a local or regional loss of electricity from the generating station, would result in loss of 110-volt AC power to all three lamps simultaneously. During normal operation, two lamps are always without power. For example, while the signal head indicates a green signal for traffic to proceed, the red and amber are off, that is, there is no AC voltage being delivered to the lamp. This absence of AC voltage will last for several minutes while the green lamp is illuminated. Similarly, when the amber lamp turns on, the red and green are without AC power. The amber will be on for, perhaps 20 seconds. When the red stop lamp turns on, the amber and green are off. Hence, a local or regional power failure will result in all three lamps losing AC power; loss of power to one or two lamps is insufficient to define a regional power loss.

In the FIG. 7 diagram, the block figure labeled as "AC Sensor" is a semiconductor component that provides a digital output signal (logical "1") if the AC voltage entering the component drops to zero volts. As there are three sources of AC signals and all must fail to define a loss of power to the intersection, three sensors are required. As described above, two of these sensors will be generating a "failed" AC voltage signal at any one time. The "AND" gate is a semiconductor device that provides a Boolean transform. All three inputs to the AND gate must be in the logical "1" state to generate an output. If two sensors provide a logical 1 (red and amber without AC voltage), the AND gate will do nothing. Only if all three, that is red AND amber AND green sense a loss of voltage will the AND gate provide an output.

Also in FIG. 7, the Latency timer is triggered to introduce a delay between when AC voltage has failed (on all three lines) and when the red lamp will begin flashing. A municipality may or may request a particular delay of latency period, such a, for example, no delay or latency, a 10-second delay or latency period between power grid failure and flashing of a lamp, a 5-second delay or latency period between power grid failure and flashing of a lamp, etc. The latency timer allows for adjustment based upon the customer's specification. Following the latency timer delay (if any), the Astable Oscillator is triggered to create a 1-per-second output. This output can be adjusted to provide a duty cycle of 50% (½ second on; ½ second off), or some other duty cycle as requested by the customer. The output of the Astable Oscillator activates the Lamp Switch, which turns the red lamp on and off, once-per-second, with an on-time defined by the duty cycle. During power grid failure the red lamp is powered by a battery, such as a 12-volt DC battery. In this example, the battery is charged while the power grid is active, and will provide a suitable period (e.g., 35 hours) of continuous, one-per-second flashing of the red stop lamp.

In some embodiments, the backup power and communication system circuitry 16 may be configured to perform, and/or may include apparatus for performing, some or all of the following functions:

a) Detect when AC power fails on all three AC lines supplying Red, Green, and Amber lamps, or additional AC lines that might be powering directional arrow indicators, red, amber, or green, or other lit traffic signal indicators.

b) Upon detection of AC failure on three (or more in a signal head) lamps, it may determine that the AC power has failed for more than 10 seconds (for example). Each lamp is often without AC power when not illuminated. For example, when sitting at a red light, the driver will note that the green and amber lights are not lit. There is no AC power to those bulbs. Hence, absent AC power to a single bulb does not constitute a failure. All 3 bulbs must be dark. And because these signals are changing, they all may be dark for a specified period of time. If the alert and action took place 1 second following failure, the system may not be down. It may have been an error in the control unit. On the other hand, if the new system waited 1 minute to determine that all 3 AC lines are out, then cars may have entered the intersection and be subject to collision. Hence, a 10-second pause before action is taken is an appropriate interval. In a well-designed system this "latency" between AC failure and action alert can be remotely "tuned."

c) Upon failure of AC power to the signal head for more than 10 seconds, the system may begin to flash only the red bulb. The rate of flash should be once-per-second with a 50% duty cycle; that is, on for ½ second and off for ½ second, but this parameter should be remotely tunable.

d) The flash rate might, for example, be tied to traffic queues, or speed of approaching vehicles, or dynamically changing based upon weather conditions or road conditions. With remote connectivity, the appropriate authority could adjust the flashing rate to environmental or road traffic conditions.

e) Of the 2, 3, 4, or more directions controlled by the backup system, 2 directions (opposites, for example), may be tuned to flash amber, while 2 perpendicular cross traffic directions flash red.

f) The backup system should maintain a flashing signal for as long as possible within the constraints of physical size in the signal head. Small, gel cell, or lithium iron phosphate, or AGM batteries can provide 24 to 72 hours of flashing time before battery depletion.

g) Batteries may be charged while the AC mains is supplying power to the signal head. Hence, the system will charge the battery while it is not required for use. (As noted below solar charging of the battery is also an option.)

In addition, this disclosure includes several options for communication. In one embodiment, each signal head will have an AC sensor, timer, and cellular modem that will send an alert to a cloud server upon AC mains failure. The alert could notify the municipal maintenance crew that power has failed at that specific signal head, or at all signal heads at the intersection. In addition, the alert will be sent to a cloud server that will quantify down time, number of AC line failures, location, whether vandalism or system failure, etc. Cloud mapping services, such as Apple Maps, Waze, and others will be notified to alert the drivers' navigation system that "Intersection Traffic Signal Failure Ahead," as an example.

Autonomous vehicles could be alerted to the signal failure, but could also be notified regarding which lamp is lit on a second-to-second basis. Notifying autonomous vehicles approaching the intersection that the amber, or green, or red lamp is lit would enable more accurate timing of braking and acceleration and general navigation.

Operation: This invention utilizes discrete isolation sensors and 555 timers and is able to detect and time AC line failure. While the device could be designed using microcontrollers, one embodiment would be designed without a microcontroller. This reduces cost and likelihood of coding errors. Discrete Boolean logic and AC detectors result in a less complicated, lower cost device. The schematic can be seen below:

The MID400 AC detector isolator has an internal LED that is illuminated by the 110-volt AC line voltage. There is a physical space within the integrated circuit package that allows for light to travel to a photodetector, which is powered by a 5-volt direct current signal. Hence, the 110 volt (high voltage) is isolated from the remainder of the circuit across a physical gap, and there is no electrical connection between the 110 volt and 5 volts systems. When the AC voltage drops to 0 volts the sensor provides an output. Using these sensors to monitor each of the 3 AC lines (Red, Amber, Green), the system is able to detect failure of each bulb. However, as all three may fail simultaneously for 10 seconds to be considered a valid loss of power, a Boolean AND gate receives the output of each sensor and provides a valid output upon failure of all 3 lines. The output of the AND gate triggers a 555 timer U3 (ICM555IBAZ-Renesas Electronics America Inc) that begins a resistor-capacitor timing circuit to measure 10 seconds. Should the AND gate remain high for 10 seconds, the 555 timer generates a signal to activate an astable multivibrator using 555 timer U1 (Renesas). The output of this device, U1 (ICM555IBAZ), drives a load switch U2 (TPS22810 from Texas Instruments). This load switch turns on and off 12-volts DC to power the red flashing traffic signal. U1 is designed to oscillate at 1 Hz with 50% duty cycle.

The backup power supply 14 may be powered by a 12-volt lithium iron phosphate battery, or lithium ion, or gel cell, or AGM, or other battery chemistry. This battery, with a capacity of 10 amp hours, will flash the red bulb for 60 hours. Smaller capacity batteries can be chosen for shorter flash duration. A standard lithium chemistry battery charger will continuously charge the battery while AC power is available, which is likely to be the majority of time. Hence, the battery is fully charged when an AC voltage failure occurs. To maximize cycles and battery life, lithium chemistry batteries are best discharged periodically. The device has the capability to utilize 2 batteries in parallel to double the amp-hour capacity, yet isolate each battery periodically so that one of the batteries can be discharged while the other continues to provide power to the device. At a later preprogrammed time, the 2nd battery is disconnected from the device and discharged. This scheme will result in maximum battery life while not jeopardizing up time.

An alternative or additional means for charging the backup power supply battery 14 may comprise solar panels (photovoltaic) and solar charging circuitry such as the ST Micro SPV1040, or Linear Technology LT3652, to maintain battery charge.

Optional Radio connectivity of multiple signal heads: (Also see example of FIG. 2) In certain deployments the municipality might prefer that all of the lamps guiding lanes in a common direction all flash simultaneously. For example, if there are 3 signal heads guiding drivers in the northbound direction, all 3 lamps should flash in unison upon AC failure. To accomplish this, the device may coordinate with similar devices in the other 2 signal heads servicing the north-bound traffic. Running wires between the signal heads is costly. An alternative solution is for each of the sensors in the 3 signal heads to communicate at 2.4 GHz, or other frequency or protocol, The communication can be via a mesh network, or controller-responder protocol. When one lamp flashes, the other 2 lamps on the northbound side will flash at the same time. The same coordinated flashing can be accomplished by utilizing an external radio signal generated by a GPS satellite and received using a GPS receiver, or utilizing the cellular system for precise timing and coordination. A real time clock module could also lead to simultaneous flashing of the red lamps.

Optional Remote monitoring and alerts: With local on-board radios, the devices not only can communicate with each other in a local area network (LAN), they could also communicate to a "gateway" that is a node in the LAN that would pass bidirectional information via an incorporated cellular modem to the cellular network, or the LAN could connect to local ethernet or fiber transmission line available in the RSU. The gateway might be positioned in one of the signal heads and communicate via radio network to all the other signal heads. When AC failure occurs in all of the signal heads thereby designating a regional blackout, the gateway and included cellular modem would alert maintenance personnel. The red lamps would begin to flash after 10 seconds. If only one or two of the AC lines fail owing to vandalism, for example, the system would know the location of these failures and notify personnel of possible vehicular impact to a single pole or vandalism, but that the failures are not a result of a widespread blackout. A single lamp failure that controls one of many northbound lanes, for example, would likely result from vandalism. Under this scenario, a flashing red lamp on lane 2 of 4 northbound lanes at the intersection would be confusing for drivers. Signal head-to-signal head communication would allow confirmation between the lamps, and only when all lamps are out would the red lamp flash.

Once the AC failure is detected on the LAN and passed to the gateway and via cellular, ethernet, or fiber connectivity to the cloud, the information would result in an alert to appropriate maintenance personnel, as well as to cloud services such as Waze mapping and Apple maps. This would then alert drivers of the failure of traffic signals ahead. The same alert provided to appropriate cloud service providers would display an alert on the dashboard of approaching vehicles by Geofence; only vehicles traveling in the proper direction at the necessary distance would be notified.

With the addition of an accelerometer or semiconductor compass on the device, alerts would be generated to identify vehicular impact of a support structure, excessive movement in the wind, rotation of the signal head, compass heading of the signal head, etc. Temperature sensors in the device would alert traffic coordinators of frost, icy road potential, etc. Humidity sensors along with temperature sensors on the device could provide data for post processing for immediate detection of dew point, fog, etc. The formation of fog that compromises driver visibility would lead to an alert seen on the dashboard of approaching vehicles several miles distant so that the drivers would slow down and be prepared.

Optional Remote Control of the Device: In addition to alerts generated and forwarded by the system, distant control and tuning of the devices would be available. Flash timing and duration, latency delay before flashing, sensitivity of vibration detection (accelerometer), firmware updates, all could be accomplished from the desktop in a central control facility and not require access to the signal heads hanging over an intersection. Operational status, battery status, testing during off hours, all could be available remotely.

Optional Wireless Communication Access Point (with or without the Backup Power and/or other Communication Apparatus): A novel feature of this disclosure is the inclusion of a WiFi modem, WiFi hotspot, radio or other wireless communication protocol access point device, in or on the traffic signal For example, in some embodiments, a WiFi access point (e.g., WiFi modem, hotspot, etc.) in a traffic signal head, with or without other aspects of the backup power and communication system. This allows for vehicles requiring broadband access, preferably at low cost, to load and receive data when they pass within WiFi connection range of the WiFi equipped signal head. There are numerous vehicles on the roadways collecting video and images utilizing cameras and/or sensors. Among these are vehicles which use cameras and/or other sensors to collect current data on road conditions (e.g., road conditions, status of infrastructure and critical safety devices, road roughness, road dryness/wetness, temperature, other weather conditions, obstructions, accidents, areas of road or lane closures, etc.) and upload that data to transportation department, government or private Cloud servers when suitable WiFi access is available to facilitate such data upload. For example, companies such as; Drivewyze Inc., 5425 Calgary Trail NW, Edmonton, AB T6H 4J9, Canada; Blyncsy, Inc., 650 South 500 West, Suite 360, Salt Lake City, Utah 84401; and Rekor Systems, Inc., 6721 Columbia Gateway Dr, Suite 400, Columbia, MD 21046, offer devices and software applications that may be mounted on trucks or other vehicles to collect data. These cameras may be installed by the original equipment manufacturer, (e.g., Ford, GM), or purchased by a fleet manager to place in trucks. Image data, road vibration and roughness data acquired by the vehicle's suspension sensors, presence of a work zone, incidents ahead, etc., all represent valuable information and typically are uploaded when the vehicle is in proximity to a known wi-fi access point. These existing access points may include, for example, home or business wi-fi networks, warehouse facilities, paid access points (e.g., Starbucks). However, this approach limits the usefulness of the data because it is not real time. Having wi-fi or other wireless access points distributed across a municipality in traffic signal heads makes more likely that a vehicle with important data to transmit can do so with shorter latency (delay). Using a stationary wi-fi or other wireless access point in a signal head also provides for the opportunity to connect the access point to the internet using fiber-optic cable, or ethernet, or other wired or wireless transmission medium rather than cellular, which is often at high cost for large amounts of data.

Traditionally, vehicles that collect such data upload the data to Cloud servers only when the vehicle comes within range of a contracted WiFi point or the driver's home, or a maintenance facility or fleet parking area. However, scarcity of WiFi access points in some areas can result in delayed transmission and long periods between collecting the image and transferring the data. For real time image collection validating an accident occurrence or damaged infrastructure, immediate uploading of data is required. Disclosed herein are traffic signal heads which are equipped for WiFi connectivity so that these vehicles can upload their data each time they pass within WiFi range of a traffic signal head that is equipped for WiFi connectivity in accordance with this disclosure. In some embodiments, a passcode, key or other credential may be required to enable the passing vehicle to connect to the WiFi network or other wireless communication protocol or network. In some embodiments, the signal heads would receive the WiFi data from the passing vehicle and then transmit such data, via Fiber or Ethernet in the RSU, at high speed and low cost. In this regard, the WiFi portions of the circuitry 14, 22 could be installed with or without inclusion of the backup power portions of the circuitry 14, 22 and backup power supply 16, 26.

Accordingly, a non-limiting example of the backup power and communication system with inclusion of several optional features is set forth below:

Example: Functionality of One Embodiment of a Backup Power and Communication System with Optional Cellular and Cloud Connectivity The system will detect AC line failure following a user-specified latency (for example, AC power failure of 1 second, 10 seconds or any dura on requested). Upon AC power failure exceeding the requested period, the red bulb will flash at a frequency of 1 Hz (1 flash per second) with a duty cycle of 50% (on for ½ second; off for ½ second). They system in various configurations can perform the following functions:

a) Detect, wait, and flash the red bulb. Upon restoration of power the system will cease operation and turn over control to the Roadside Unit control box.
b) Via cellular communication send an alert to the municipality that AC power has been interrupted.
c) Synchronize all signal heads via local radio communication providing for simultaneous flashing of all signal heads in one direction, independent of coordinated simultaneous flashing in other directions.
d) Notify cloud services (e.g., Waze, Apple Maps, Google Maps, other public or proprietary navigation, traffic monitoring, and/or electronic mapping systems) that the signals are out in the intersection ahead.
e) Be "tuned" remotely to update capabilities.
f) Receive periodic (frequency customer selected) status reports pertaining to battery charge, operational status.

g) Provide local (specific to that intersection) real-time temperature and humidity data, from which likelihood of ice, fog, or wet pavement can be determined.

h) Send alerts regarding loss of AC power to individual signal heads, possible implying vandalism.

i) At customer request, not flash (red) one signal head if the other signal heads controlling the same direction are operational.

j) Notify appropriate agency of strong winds, significant impact, or downed overhead support/supporting cable).

Specifications:

1) Flash duration: options include standard 17 hours. Optional larger capacity battery to 60 hours.
2) Will not interfere with existing RSUs.
3) Replaces red bulb with new GE (Current®) bulb specifically designed for the application.
4) Battery life exceeding 5 years.
5) Flash Duration: 1 second with 50% duty cycle.
6) Flash brightness—as per MUTCD and I.T.E. specifications. Same as existing signal heads.
7) Fits inside signal head housing.
8) Typical install 10 minutes. No tools required (screwdriver required if tape is not preferred).
9) Radio communication: Optional cellular connectivity; optional LAN 2.4 GHz;
10) Powered by at least one 12-volt DC battery. Power consumption 1 milliamp for monitoring system. Transient (500 milliseconds requirement for 500 milliamps during cellular connection).

The invention has been described hereinabove with reference to certain examples or embodiments of the invention but that various additions, deletions, alterations and modifications may be made to those examples and embodiments without departing from the intended spirit and scope of the invention. For example, any element or attribute of one embodiment or example may be incorporated into or used with another embodiment or example, unless otherwise specified of if to do so would render the embodiment or example unsuitable for its intended use. Also, where the steps of a method or process have been described or listed in a particular order, the order of such steps may be changed unless otherwise specified or unless doing so would render the method or process unworkable for its intended purpose. All reasonable additions, deletions, modifications and alterations are to be considered equivalents of the described examples and embodiments and are to be included within the scope of the following claims.

What is claimed is:

1. A traffic signal equipped with a WiFi modem, WiFi hotspot, other WiFi communication device, radio, or other wireless communication protocol access point device which enables vehicles which pass within connection range of said traffic signal to upload data to the traffic signal;

wherein the traffic signal is further equipped with apparatus for wired or wireless transfer of data which has been uploaded to the traffic signal, to a remote computer or server.

2. A method for using a traffic signal according to claim 1 to provide data relating to roadways and traffic to said remote computer or server, said method comprising:

causing a vehicle to collect said data through one or more cameras or sensors on the vehicle;

causing the vehicle to upload said data to the traffic signal when the vehicle passes within WiFi connectivity range of the traffic signal; and causing the apparatus for wired or wireless transfer of data to transfer the uploaded data to said remote computer or server.

3. A method according to claim 2 wherein the data comprises at least one data type selected from: road conditions; status of infrastructure; status of critical safety devices; road roughness; road dryness/wetness; temperature; other weather conditions; obstructions; accidents; closures of areas of road or lane(s).

4. A traffic signal according to claim 1 further comprising:

a battery for providing backup power to at least one light emitter of the traffic signal; and circuitry configured to a) determine when an actionable power interruption event has occurred; b) cause said at least one light emitter to operate in an emergency mode using backup power from the battery in response to a determination that an actionable power interruption event has occurred; and c) send notice of the actionable power interruption to one or more other locations.

5. A traffic signal according to claim 4 wherein the circuitry is further configured to determine when power to the traffic signal becomes restored and, in response to such determination, cause said at least one light emitter to return to usual function.

6. A traffic signal according to claim 4 wherein said at least one light emitter comprises a plurality of light emitters which turn on and off at different times, and wherein the circuitry determines that an actionable power interruption event has occurred when none of the light emitters have turned on for a predetermined latency period.

7. A traffic signal according to claim 6 wherein said plurality of light emitters comprises a green light emitter, an amber or yellow light emitter and a red light emitter, and wherein the circuitry determines that an actionable power interruption event has occurred when each of said red, amber or yellow and green light emitters have failed to turn on for said predetermined latency period.

8. A traffic signal according to claim 6 wherein the predetermined latency period is less than one minute.

9. A traffic signal according to claim 6 wherein the predetermined latency period is adjustable or selectable.

10. A traffic signal device according to claim 4 wherein the circuitry causes said at least one light emitter to emit flashing light when operating in said emergency mode.

11. A traffic signal device according to claim 10 wherein the circuitry comprises a receiver which receives remote control signals for changing or adjusting the rate and/or duty cycle of the flashing light emitted or to be emitted when operating in said emergency mode.

12. A traffic signal according to claim 4 wherein the circuitry comprises a cellular modem and is configured to send and/or receive information over a cellular network.

13. A traffic signal device according to claim 3 further comprising a solar panel or solar collector for charging the battery.

* * * * *